United States Patent [19]

Hustad et al.

[11] Patent Number: 5,443,154
[45] Date of Patent: Aug. 22, 1995

[54] EASY SEPARATING PACKAGE AND METHOD

[75] Inventors: Gerald O. Hustad, McFarland; Jeffrey M. Lipinski, Waunakee, both of Wis.

[73] Assignee: Oscar Mayer Foods Corporation, Madison, Wis.

[21] Appl. No.: 127,390

[22] Filed: Sep. 27, 1993

[51] Int. Cl.$^6$ .............................................. B65D 75/62
[52] U.S. Cl. .................................. 206/213.1; 206/469; 383/207; 383/209; 493/212
[58] Field of Search ............................ 206/467, 469; 383/200–209; 426/122; 493/62, 212, 213

[56] References Cited

U.S. PATENT DOCUMENTS

| | | |
|---|---|---|
| 185,469 | 12/1876 | Arkell . |
| 1,200,735 | 10/1916 | Klein . |
| 2,047,745 | 7/1936 | Poppe . |
| 2,054,298 | 9/1936 | Poppe . |
| 3,172,443 | 3/1965 | Ausnit . |
| 3,619,395 | 11/1971 | Skendzic . |
| 3,902,655 | 9/1975 | Huffman . |
| 4,549,657 | 10/1985 | Martin . |
| 4,787,517 | 11/1988 | Martin . |
| 4,823,961 | 4/1989 | Griesbach et al. . |
| 4,846,585 | 7/1989 | Boeckmann et al. . |
| 4,923,309 | 5/1990 | Van Erden . |
| 5,026,563 | 6/1991 | Van Erden et al. . |
| 5,077,064 | 12/1991 | Hustad et al. ................... 426/122 |
| 5,118,203 | 6/1992 | Andronico . |

FOREIGN PATENT DOCUMENTS 2241689 9/1991 United Kingdom .
8203372 10/1982 WIPO .

*Primary Examiner*—Jimmy G. Foster
*Attorney, Agent, or Firm*—Lockwood, Alex, FitzGibbon & Cummings

[57] ABSTRACT

A hermetically sealed food product package is provided having a vacuum sealed or gas flushed and sealed product cavity and having a preformed perforated or cut-away portion on at least one of the sheets of film forming the package to allow easy separation of the package in order to gain access to the vacuum or gas flushed product cavity.

31 Claims, 4 Drawing Sheets

EASY SEPARATING PACKAGE AND METHOD

FIELD OF THE INVENTION

The present invention relates to a package and to a method of producing the package. More particularly, the invention relates to a food product package and method for making it where the package is hermetically sealed, forming a vacuum or gas-flushed product cavity and is provided with a preformed cutaway portion allowing easier separation of the sealed package and access to its contents.

BACKGROUND OF THE INVENTION

A variety of cheeses, meats, hot dogs and other processed meats and food products are sold in packages formed from flexible thermoplastic materials. These packages have generally been formed by placing two sheets of thermoplastic material in face to face contact and sealing the periphery of the two sheets to form a product cavity. In order to insure the freshness and shelf-life or freezer-life of such foods, it is well known in the art to evacuate and hermetically seal the content storage area of such packages. However, when the hermetic seal is initially broken to gain access to the contents, it is quite often the case that the entire contents of the package are not utilized or consumed at once. It is difficult to reclose the package and preserve the contents in a fresh state for storage in a refrigerator for later consumption, which often requires the consumer to completely repackage the contents in another container. To overcome this problem, there have been many prior art package configurations which offer means of opening and resealing the package to preserve freshness.

Some prior art packages utilize what is commonly referred to as closure strips on each of the two inner surfaces of the thermoplastic packaging material. The closure strips are generally thermoplastic beads, where the beads have an interlocking profile to securely seal and reseal the contents of the package.

However, the prior art food packaging products encounter the problem that it is difficult to initially open the package because the film sheets which make up the package often do not slide very easily against each other to provide one exposed film edge to grasp. It therefore becomes difficult to break the hermetic seal and gain access to the food product. Food packages with recloseable interlocking beads or zipper strips, as well as those with tamper-evident features, still require the consumer to digitally manipulate the sheets of material forming the package and separately grasp each sheet of material in order to initially separate the interlocking beads of the closure strip or to separate the two sheets of hermetically sealed thermoplastic material to gain access to the contents. This separation of the thermoplastic material is made difficult by the face-to-face configuration of the two sheets as well as the similarity in texture and visual characteristics of the two sheets. If the digital manipulation required to separate the two sheets of thermoplastic material is too tedious, consumers may become frustrated with the packaging and switch to products sold in packages which may not be hermetically sealed but are more easily opened.

SUMMARY OF THE INVENTION

The vacuum sealed or gas flushed hermetically sealed package of the present invention overcomes the deficiencies of the prior art by providing a food product package that is easily opened with minimum manipulation by the consumer. The package generally includes two sheets of barrier films having their inner faces in intimate contact about their periphery forming an outer seal. An inner hermetic vacuum seal disposed inwardly from the outer seal cooperates with a portion of the outer seal to form a vacuum or gas flushed product cavity. A perforation line or lines of weakening through both of the two sheets of barrier film form a tear away strip that extends from edge to edge substantially parallel to the inner hermetic vacuum seal. The tear away strip is disposed between the outer seal and inner hermetic vacuum seal. A second perforation line extending arcuately downward from the first perforation line and through only one of the two sheets of barrier film is adapted to form a cutaway portion on one of the barrier films when the tear-away strip is removed to allow easy separation of the two barrier films and access to the vacuum product cavity.

It is therefore a general object of the present invention to provide an easy opening vacuum sealed or gas flushed food product package.

It is a further object to provide a hermetically sealed vacuum or gas flushed sealed food product package formed from two sheets of barrier film that are easily separated with minimal manipulation to provide easy access to the product cavity.

Still a further object of the present invention is to provide a method for making the easy open food product package of the present invention.

BRIEF DESCRIPTION OF THE DRAWINGS

For a more complete understanding of the present invention reference should now be made to the embodiments illustrated in greater detail in the accompanying drawings and described below by way of example of the invention. It should be understood that the invention is not necessarily limited to the particular embodiments illustrated herein but is defined by the appended claims.

IN THE DRAWINGS

Figure 1:
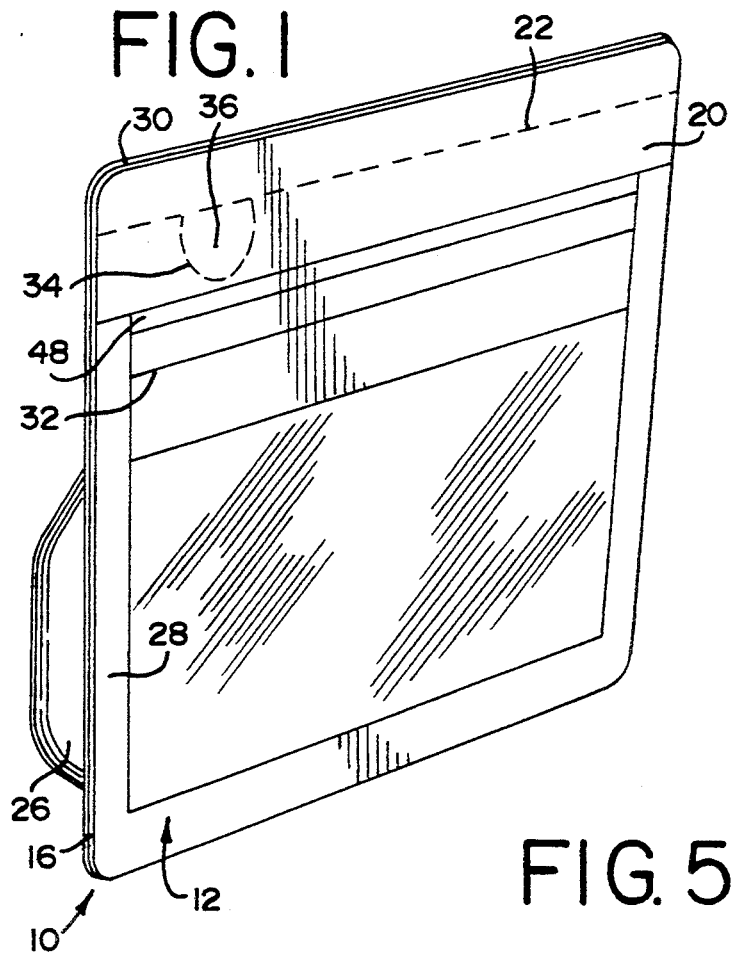
Figure 2:
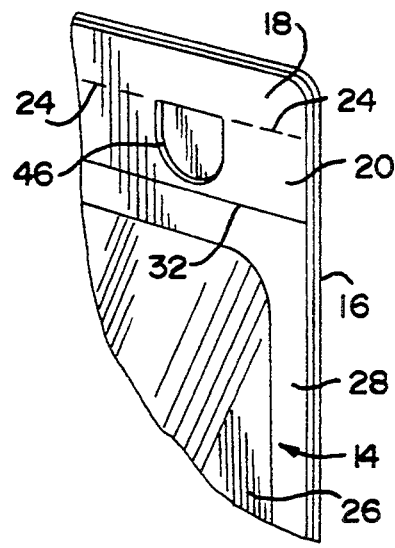
Figure 1A:
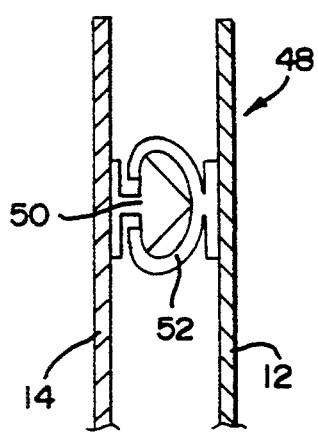
Figure 5:
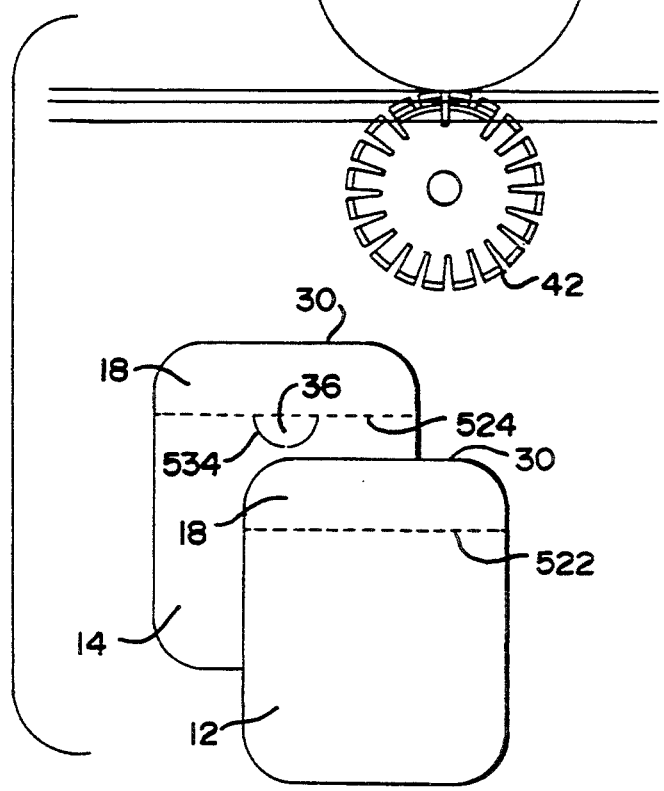
Figure 3:
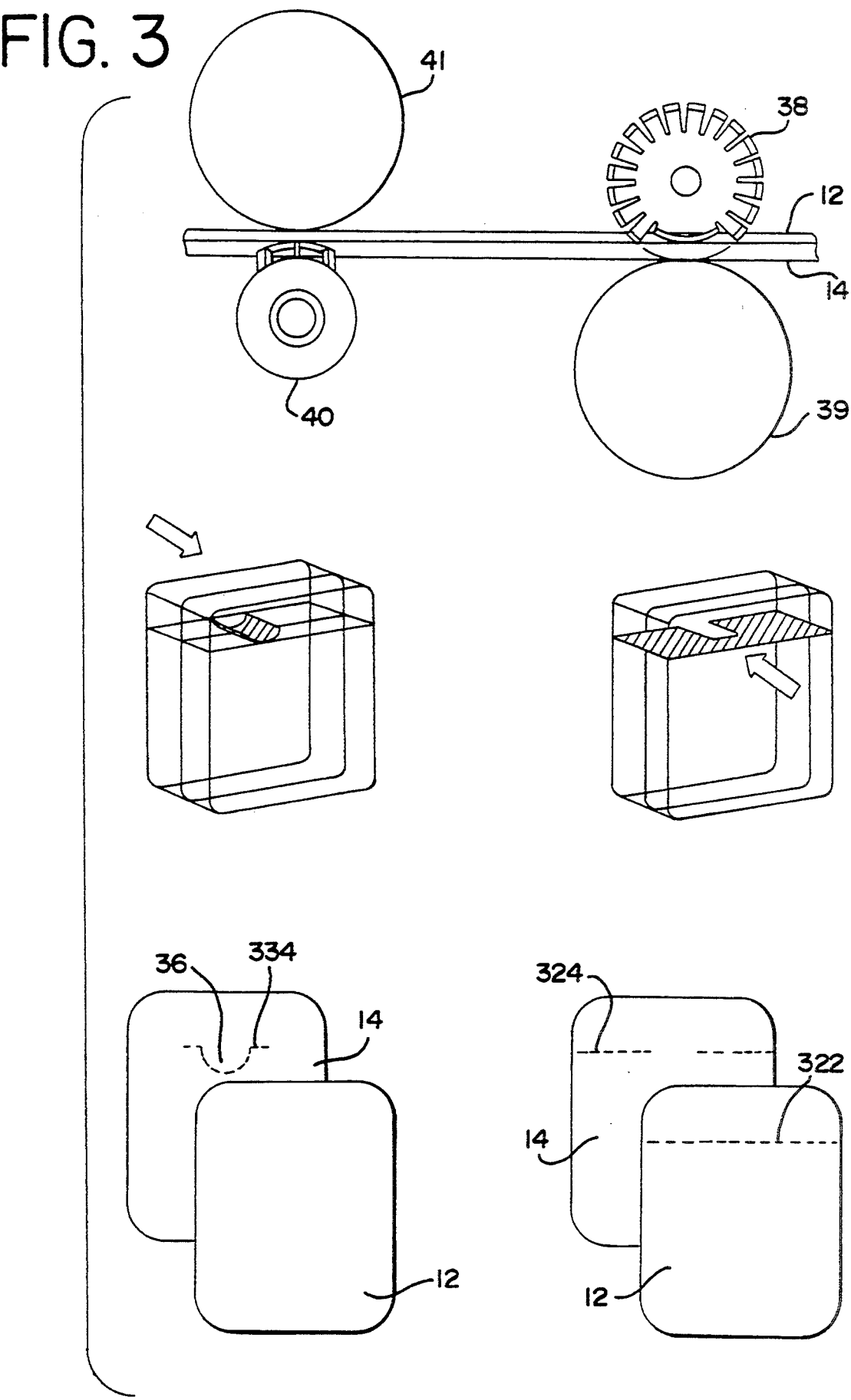
Figure 4:
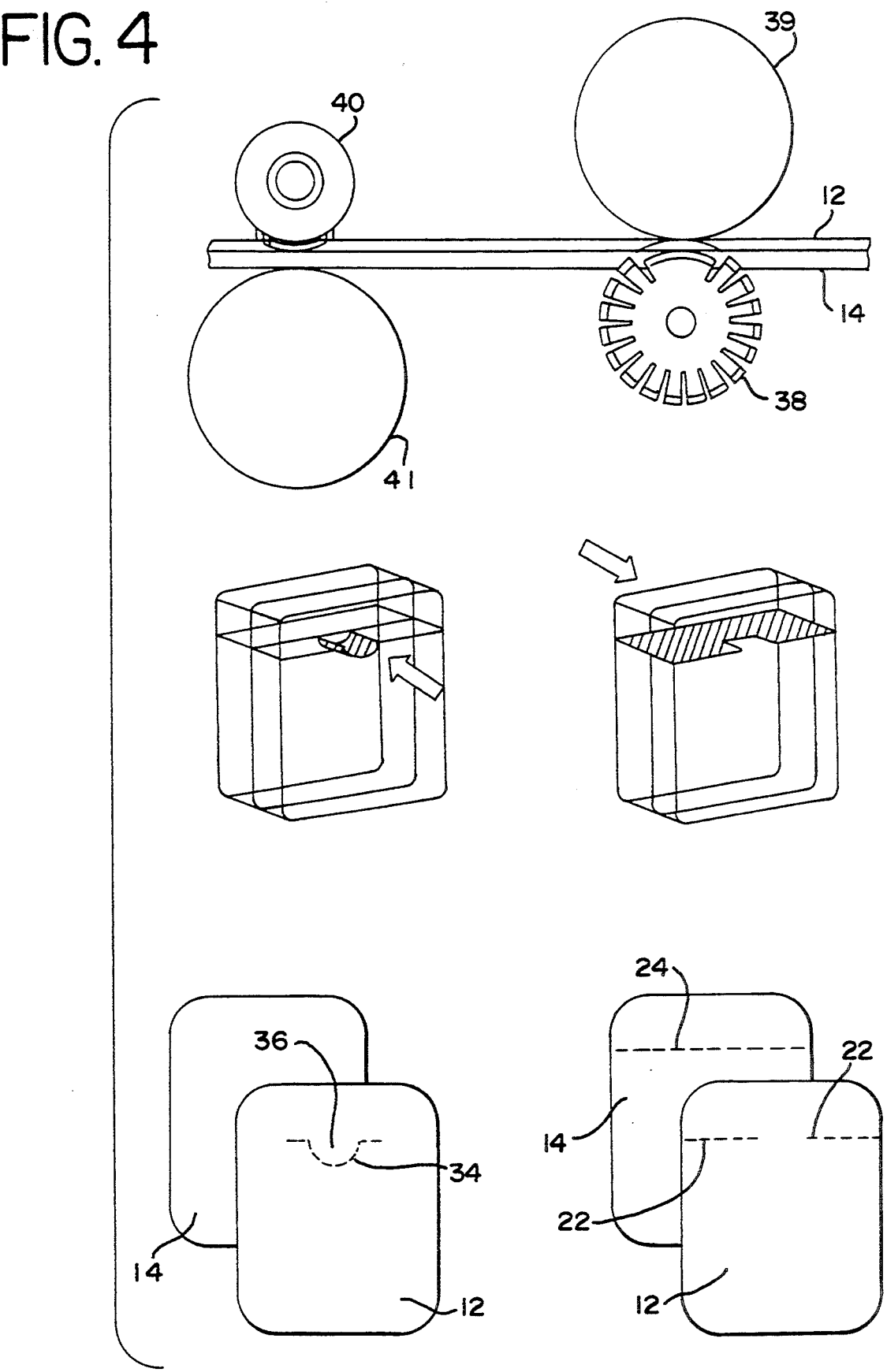

FIG. 1 is a perspective view of a food product package made according to the present invention;

FIG. 1A is a cross-sectional view of a zipper-like closure which may be incorporated into the package;

FIG. 2 is a cutaway section perspective view illustrating the back side of a food product package made according to the present invention having the cutaway portion preformed;

FIG. 3 includes a side view of a food product package moving through a series of perforation tools and generally schematic perspective views illustrating the resulting package sheets and their respective perforation lines;

FIG. 4 is a side view of another food product package moving through a series of perforation tools and generally schematic perspective views illustrating the resulting perforation lines;

FIG. 5 is a side view of a further food product package moving through a multi-cut perforation tool and a generally schematic perspective view illustrating package sheets and the corresponding perforation lines.

Figure 6A:
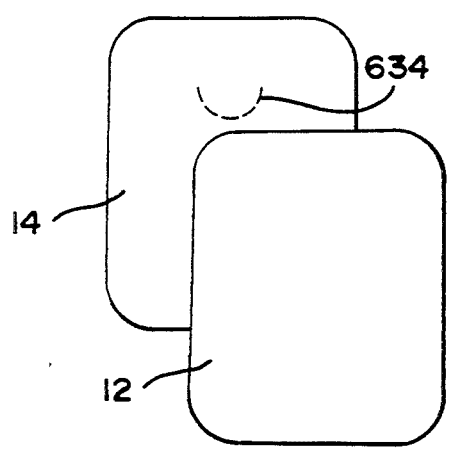

FIG. 6a is a generally schematic perspective view of film utilized to form a food product package illustrating perforations formed thereon prior to the formation of the package.

Figure 6B:
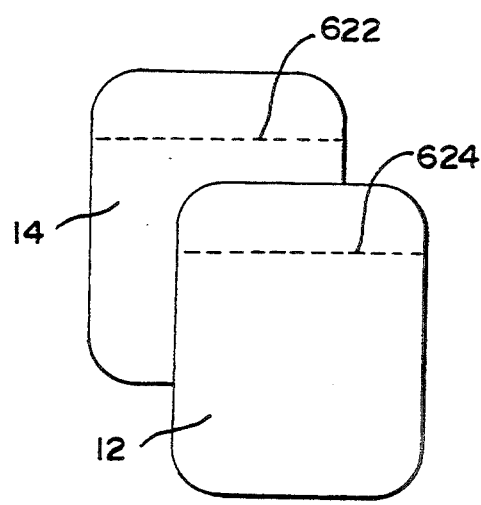

FIG. 6b is a generally schematic perspective view of film utilized to form a food product package illustrating perforations formed thereon prior to the formation of the package.

Figure 7:
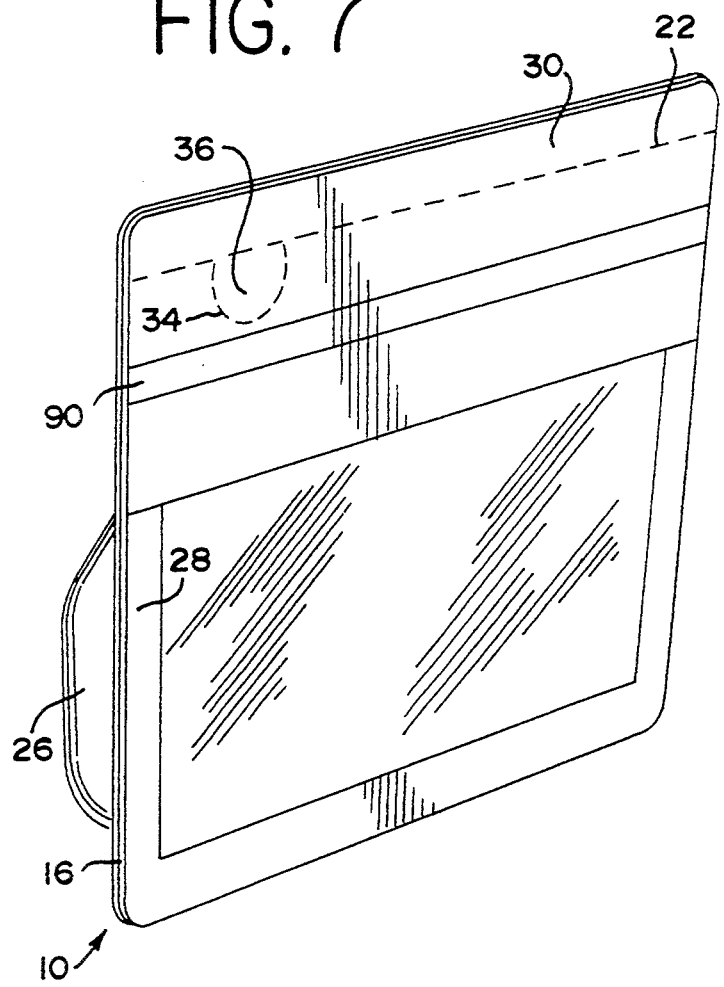
Figure 7A:
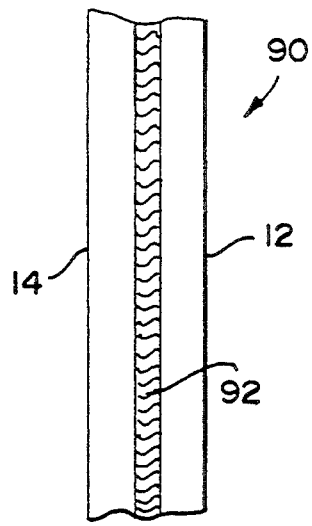

FIG. 7 is a perspective view of a food product package made according to the present invention; and FIG. 7a is a cross-sectional view of a pressure sensitive adhesive closure which may be incorporated into the package.

DETAILED DESCRIPTION OF THE PREFERRED EMBODIMENT

Referring to the drawings in greater detail, an easy opening hermetically sealed package, generally designated 10, is shown in FIG. 1 as including several principal parts. As is best shown in FIG. 1 the illustrated easy opening package 10 includes a nonforming sheet of thermoplastic film 12 and a forming sheet of thermoplastic film 14 in generally face to face contact and sealed about their periphery 16. An inner seal 32 formed in a manner well known in the art cooperates with portions of the sealed periphery 16 to produce a vacuum product cavity 26.

While the invention may be embodied in a variety of forms and used in different applications, description of a preferred embodiment of the inventive concept will be made wherein the package is utilized to hold and display sliced deli meats such as bologna or ham. It should be noted that these packages generally include one or more laminate of a polyvinylidene chloride, ethylene vinyl alcohol (EVOH) film, or other barrier films. These types of films are not essential to the present invention; for example, suitable peelable or breakaway seals can be formed between ethylene-polar monomer copolymer films or coatings and other thermoplastic materials. There are, however, certain unique properties of polyvinylidene chloride and EVOH films which, by reason of their own individual characteristics and cooperative characteristics exhibited with ethylene-polar monomer copolymer films and coatings, make these films particularly suitable for use in the improved packages of the present invention.

It is well known in the art to use forming and nonforming films in the preparation of food product packages, the former being capable of retaining a predetermined shape generally complementary to the shape of the food product. A nonforming film is then placed over the forming film and sealed about its perimeter providing a cover.

In the present invention, the forming film 14 is shaped to accept sliced deli meat such as ham and the nonforming sheet 12 provides a cover and is sealed about the periphery 16 of the two sheets by an outer seal 28. It should be understood that it is not essential for the invention to have nonforming and forming films as any combination of the two films may be utilized with the invention (i.e. forming—forming, nonforming—nonforming).

The hermetically sealed gas flushed package 10 also includes a tear away strip 18 spaced slightly inwardly from the top edge 30 of the package. Tear away strips are generally known in the industry and generally serve as a tamper indicating mechanism. Tear away strips are generally formed by perforating a line across a package near the top edge and through both films. In addition, the tear away strip 18, when severed, provides an area 20 where the forming film 14 and the nonforming film 12 are not sealed together thereby providing an area where separation of the two films is easily accomplished to gain access to the food product cavity.

In the embodiment shown in FIG. 4, the tear away strip 18 includes lines of weakening or perforations 22 and 24 that extend across the two films parallel to the top edge 30. The perforations do not substantially weaken the package to the point where it may be accidently torn, but do provide or define a tear guideline so that the top portion of the package (i.e. both of the film sheets above the perforations) will separate from the lower product cavity portion of the package along a predetermined line defined by the perforations 22 and 24.

Although the perforations 22 and 24 break the outer seal 28, they do not affect the integrity of the vacuum product cavity 26 because the package 10 is provided with an inner seal 32 extending parallel to the tear away strip 18 and disposed such that the tear away strip 18 is positioned between the outer seal 28 and inner seal 32. Thus the product cavity 26 formed by the cooperation between the inner seal 32 and portions of the outer seal 28 is maintained even after tear away strip 18 is severed.

Once the tear away strip 18 is severed, in order to gain access to the product cavity 26, the consumer need only separate the forming film 14 and nonforming film 12 in the nonsealed area 20 and break the inner hermetic seal 32. To insure that the functional integrity of the gas flushed product cavity 26 is maintained and not broken during handling yet easily opened when so desired, it has been determined that the inner seal 32 should have an opening force of from about 1.5 to 6.0 pounds and preferably from about 2.5 to 3.5 pounds. In the past, an opening force as recited above has generally not posed a problem of opening the packages for consumers, however, grasping the opposing films that are sealed together in order to apply the opening force was often difficult and frustrating.

The present invention is therefore further provided with a closed-loop perforation line 34 extending away from one portion of perforation line 22 or 24 and toward a second portion of perforation line 22 or 24 in a closed loop. The perforation line 34 therefore defines an area 36 generally continuous with the tear away strip 18 that forms a cutaway portion in one of the films when the tear away strip 18 is removed, thereby exposing both the inner and outer surface of one of the films allowing the consumer to easily separate the two films and gain access to the product cavity 26. It is important to note that perforation line 34 extends only through one of the films and therefore contacts only one or the other of perforation lines 22 and 24 to form the cutaway portion. As shown in FIGS. 1 and 4, it is preferred that the perforation line 34 be made in the nonforming film 12, because the nonforming film 12 often is designated as the front of the package; therefore, when the tear-away strip 18 is removed and the cutaway portion is formed, the cutaway portion is immediately visible to the consumer. It is also preferred that the perforation line 34 be generally semicircular and large enough for a consumer to insert a portion of a finger or thumb in the area defined by the cutaway portion.

It is preferred that the area 36 defined by perforation line 34 be formed integrally with the area of either of the films disposed above perforations 22 or 24 as shown in FIGS. 1 and 4 so that the cutaway portion is automatically formed when the tear away strip 18 is removed. As shown in FIG. 4 perforation line 22 is comprised of 2 segments, each segment extending from opposite edges of the package toward the center of the package. The perforation line 34, which preferably follows a semicircular pattern, extends below perforation line 22 connecting the two segments of perforation line 22. Thus, when the tear away strip 18 is severed from the lower product cavity section of the package 10, the area 36 defined by perforation 34 automatically separates from the lower product cavity section of the package 10, thereby forming the cutaway portion.

With a cutaway portion on one of the films, both the inner and outer surface of the film is exposed and the consumer may easily grasp the film and pull it away from the other film so that the other film may be easily grasped. Once both films are grasped the consumer can easily supply the required force to break the inner hermetic seal 32 and separate the two films to gain access to the food product cavity 26. It should be noted that it is preferred that the cutaway portion of the present invention be utilized with a tamper indicating tear away strip; however the cutaway portion may also be utilized on packages without the tear-away strip.

There are several methods by which the package of the present invention described above may be produced. As is well known in the food package industry, when forming a food package of the type described herein, typically two films are initially sealed together only over a portion of their periphery, such as on three sides of a rectangular package, so that an interior compartment or cavity is formed and is accessible through the unsealed edge. The food product is then placed through the unsealed edge or mouth into the package and the opening or mouth is then sealed.

The preferred method of forming the present invention is done in a conventional manner up to the point where the food product is placed through the mouth into the food product cavity. After the food product has been inserted into the food product cavity, the remaining unsealed edge of the outer perimeter of the two films is sealed in a conventional manner. At the same time, an inner seal spaced inwardly from the outer perimeter of the two films is also formed by conventional pressure sealing machines creating a hermetically sealed product cavity.

In the preferred method of practicing the present invention, the package 10 having previously had its outer seal 28 and inner seal 32 formed as above is perforated along line 22 and 24 through both of the films, such as the forming film 14 and non forming film 12, by a perforation tool 38 that cooperates with a mandrel 39 illustrated in FIG. 4 for forming the desired perforation pattern, also shown in FIG. 4. Perforation tools in general are known in the art. The particular illustrated perforation tools are designed to cut or perforate the desired patterns shown. Alternatively, laser scoring may be utilized to produce the desired perforation patterns. The perforations 22 and 24 are disposed between the previously formed outer seal 28 and inner hermetic seal 32. In the FIG. 4 embodiment, perforation line 24 is a continuous perforation from edge to edge on the forming film, however, it is preferred that perforation line 22 not be continuous but be made up of discontinuous segments connected by perforation 34 so that the area 36 defined by perforation 34 will automatically separate from the lower product cavity section when the tear away strip 18 is severed.

The package 10 having continuous perforation line 24 on forming film 14 and discontinuous perforation line 22 made up of two distinct segments on nonforming film 12 is perforated a second time by another perforation tool 40 which cooperates with mandrel 41 to score a semicircular perforation line 34 extending through only the nonforming film 12 and connects the previously made segments of the discontinuous perforation line 22. Although the continuous and discontinuous perforation lines may be made on either the forming or nonforming film, it is important to note that the semicircular perforation line 34 must be made only on the film having the discontinuous perforation line to connect the segments and form the area 36. Thus when the tear away strip 18 formed by perforations 22 and 24 are severed, a cutaway portion will automatically be formed on the nonforming film 12.

An alternative method of forming the package of the present invention illustrated in FIG. 3 utilizes the same steps of forming the package as the preferred method, except that the position of the perforation tools 38 and 40 are reversed so that perforation 334 and discontinuous perforation 324 are formed on the forming film 14 and a continuous perforation 322 is formed on nonforming film 12. This may be desirable, where, for example, product labeling extends across the front of the package and the area 36 defined by perforation 334 contains a portion of the label which would be severed when the package was opened if the area 36 were defined on nonforming film 12.

In a third method, shown in FIG. 5, a single perforation tool 42 that cooperates with mandrel 43 is utilized to form perforation lines 524 and 522 on the forming and non forming films respectively and to simultaneously form a perforation line 534 which is typically semicircular, through only one of the two films. This method produces the package of the present invention wherein the area 36 is formed such that the cutaway portion is not automatically formed when the tear away strip 18 is severed thus requiring the consumer to perform the additional step of removing the area 36 defined by the perforation line 534 to form the cutaway portion.

Yet another method of forming the package of the present invention requires the forming film to be prepunched or preperforated with cutaway portion 46 (shown in FIG. 2) below the top edge of the forming film prior to sealing. The forming film is then partially sealed around its periphery to a like sheet of nonforming film as before where an edge remains unsealed to allow the package to be filled. The remaining edge is sealed and the inner seal 32 formed. Thereafter, the package is perforated by a perforation tool along lines 22 and 24 to form the tear away strip 18. The perforations 22 and 24 each extend in a continuous line across the package spaced inwardly from the top edge of the package so that a portion of the lines 22 and 24 extend through the prepunched cutaway section 46. Thus when the tear away strip 18 is severed, the prepunched cutaway section 46 exposes both the inner surface and outer surface of the forming film allowing a consumer to easily grasp the forming film and separate it from the nonforming film to break the inner seal 32 and gain access to the vacuum product cavity 26. A portion of a package formed by this method is illustrated in FIG. 2. It should be noted that in all the methods utilized to form the cutaway portion or prepunched area, the perforation of the cut away area is easier to sever than the perforations along lines 22 and 24. This is because there are fewer points to sever along the perforation of the cut away portion than the lines 22 and 24.

Another method of forming the package requires both films to be preperforated or prepunched prior to sealing. As shown in FIG. 6a, the finger area is initially formed by perforation line 634. Perforation lines 622 and 624 are formed on the other film by suitable perforation tools. The package is then partially sealed as before to accommodate filling and then finally sealed along its top edge or mouth. Forming the package by this method increases efficiencies and ensures proper alignment of the two films, particularly when large webs are utilized as the source of the films.

It should also be noted that the present invention may be utilized in connection with a recloseable package having a zipper-like closure such as the package disclosed in U.S. Pat. No. 4,823,961. As shown in FIG. 1 and 1A, the zipper-like closure 48 having interlocking sections 50 and 52 extends across the package and is disposed below the bottom section of the area 36 defined by perforation line 34. As with the other embodiments, the cutaway portion here is utilized to assist the consumer in easily separating the two films so that the interlocking sections 50 and 52 then may be separated to allow access to the vacuum food cavity.

Alternatively, a peelable recloseable adhesive strip 90 illustrated in FIGS. 7 and 7a may be utilized. In a package utilizing a peelable recloseable adhesive strip, the two films are joined across the width of the package below the area 36 defined by the cutaway area by a suitable pressure sensitive adhesive 92 of a type well known in the art. The pressure sensitive adhesive (PSA) allows the product cavity to be easily accessed by separating the films held together by the PSA and then resealed by applying slight pressure and engaging the inner surfaces of the films together. Sliding the films between the forefinger and thumb generally provides sufficient pressure to reseal the package allowing the PSA to hold the films in engagement along the inner surfaces.

It will thus be seen that the present invention provides a new and useful easy open vacuum food package and method of forming same having a number of advantages and characteristics, including those pointed out herein and others which are inherent in the invention. Preferred embodiments of the invention have been described by way of example, and it is anticipated that modifications may be made to the described form without departing from the spirit of the invention or the scope of the appended claims.

What is claimed is:

1. A hermetically sealed gas flushed or vacuum package comprising:
    at least two opposing faces of barrier film having their faces in intimate contact about their periphery forming an outer seal;
    an inner seal extending parallel with a portion of the outer seal and disposed inwardly therefrom cooperating with a second portion of the outer seal to form a product cavity;
    a tear away strip defined by a, first line of weakening extending substantially parallel to said inner seal and disposed above the inner seal; and
    a tab portion defined by a second line of weakening on said two opposing faces of barrier film integral with said tear away strip that separates from said package, and said second line of weakening forms a cutaway portion on one of said two opposing faces of barrier film which separates from said opposing face of barrier film when said tear away strip is severed from said package to allow easy separation of said two opposing faces of barrier film for access to said product cavity.

2. The package of claim 1 wherein said barrier film is multilayered oxygen barrier film.

3. The package of claim 1 wherein said two opposing faces of barrier film are of dissimilar composition.

4. The package of claim 1 further including a resealable closure strip having one or more interlocking ribs and grooves extending substantially parallel to said inner seal.

5. The package of claim 4 wherein said closure strip is disposed inwardly from said inner seal.

6. The package of claim 4 wherein said closure strip is disposed between said inner seal and said tear away strip.

7. The package of claim 1 wherein said first line of weakening of said tear away strip is a perforation line extending through both of said two opposing faces of barrier film.

8. The package of claim 1 wherein said tear-away strip includes a peelable adhesive surface.

9. The package of claim 1 wherein said two opposing faces of barrier film are formed from two separate sheets of barrier film.

10. A hermetically sealed gas flushed or vacuum sealed package comprising:
    at least two opposing faces of barrier film having their faces in intimate contact about their periphery forming an outer seal;
    an inner hermetic seal extending parallel with a portion of the outer hermetic seal and disposed inwardly therefrom cooperating with a portion of the outer seal to form a product cavity;
    a line of weakening defining a tear away strip extending substantially parallel to said inner seal and disposed above the inner seal; and
    a tab portion on one of said two opposing faces of barrier film integral with said tear away strip that separates from said package and forms a cutaway portion on one of said two opposing faces of barrier film when said tear away strip is severed from said package to allow easy separation of said two opposing faces of barrier film for access to said product cavity, said cutaway portion being formed by a perforation line extending downwardly from said tear away strip and through only one of said two opposing faces of barrier films.

11. The package of claim 10 wherein said barrier film is multilayered oxygen barrier film.

12. The package of claim 10 wherein said two opposing faces of barrier film are of dissimilar composition.

13. The package of claim 10 further including a resealable closure strip having one or more interlocking ribs and grooves extending substantially parallel to said inner seal.

14. The package of claim 13 wherein said closure strip is disposed inwardly from said inner seal.

15. The package of claim 10 wherein said closure strip is disposed between said inner seal and said tear away strip.

16. The package of claim 10 wherein said line of weakening of said tear away strip is a perforation line extending through both of said two opposing faces of barrier film.

17. The package of claim 10 wherein said tear away strip includes a peelable adhesive surface.

18. The package of claim 10 wherein said two opposing faces of barrier film are formed from two separate sheets of barrier film.

19. A hermetically sealed package comprising:
   at least two opposing faces of barrier film having said faces in intimate contact about their periphery forming an outer seal;
   an inner seal extending substantially parallel with a portion of the outer seal and disposed inwardly therefrom cooperating with a second portion of said outer seal to form a product cavity;
   a line of weakening defining a tear away strip extending substantially parallel to said inner seal and disposed above the inner seal; and
   one of said two opposing faces of the barrier film having a prepunched or preperforated cutaway portion extending downwardly from said tear away strip toward said inner seal adapted to expose the inner and outer surfaces of at least one of said barrier films and to allow easy separation of said two opposing faces of barrier film when said tear away strip is removed.

20. The package of claim 19 wherein said barrier film is multilayered oxygen barrier film.

21. The package of claim 19 wherein said cutaway portion extends arcuately through one of said opposing faces of barrier film.

22. The package of claim 19 further including a resealable closure strip having one or more interlocking ribs and grooves extending substantially parallel to said inner seal.

23. The package of claim 22 wherein said closure strip is disposed inwardly from said inner hermetic vacuum seal.

24. The package of claim 22 wherein said closure strip is disposed between said inner hermetic vacuum seal and said tear away strip.

25. The package of claim 19 wherein said opposing faces of said barrier film are of dissimilar composition.

26. The package of claim 19 wherein said line of weakening of said tear away strip is a perforation line extending through both of said two opposing faces of barrier film.

27. The package of claim 19 wherein said two opposing faces of barrier film are formed from two separate sheets of barrier film.

28. A hermetically sealed package comprising:
   at least two sheets of barrier film disposed adjacent each other and having their inner faces in intimate contact about their periphery forming an outer seal;
   an inner seal connecting the two sheets of barrier film extending parallel with a portion of the outer seal and disposed inwardly therefrom cooperating with a second portion of the outer seal to form a product cavity;
   a first perforation line through both of said two sheets of barrier film extending substantially parallel to said inner seal and disposed between the outer seal and the inner seal to form a tear away strip; and
   a second perforation line extending generally below said first perforation line in a generally closed loop and through only one of said two sheets of barrier film adapted to form a cutaway portion on one of said two sheets of barrier film when said tear away strip is severed from said product cavity to allow easy separation of said two sheets of barrier film for access to said product cavity.

29. A method of making a package, said method comprising:
   providing a first section of a barrier film having a cutaway portion spaced inwardly from one edge;
   providing a second section of barrier film and positioning said second section of barrier film adjacent and in face to face contact with said first section of barrier film;
   forming an outer seal about the periphery of said first section of barrier film and said second section of barrier film;
   forming an inner seal extending parallel to one edge of said package and spaced inwardly therefrom and cooperating with a portion of said outer seal to form a product cavity; and
   perforating both of said first section of barrier film and said second section of barrier film along a line through said cutaway portion when said first section of barrier film and said second section of barrier film are in face to face contact to define a tear away strip.

30. A method of making a package, said method comprising:
   providing two sheets of barrier film in adjacent face to face relationship;
   forming an outer seal about the periphery of said two sheets of barrier film;
   forming an inner hermetic seal extending substantially parallel to a portion of said outer seal and spaced inwardly therefrom cooperating with a second portion of said outer seal to provide a product cavity;
   perforating both of said two sheets of barrier film along a line spaced inwardly from the periphery of the two sheets of barrier film whereby to define a tear away strip; and
   perforating one of said two sheets of barrier film along an arcuate path extending from one segment of said line spaced inwardly form the periphery to another segment of said line spaced inwardly from the periphery.

31. A method of making a package, said method comprising:
   providing a first section of barrier film;
   perforating, said first section of barrier film inwardly of an edge along an arcuate line for defining a cutaway area of said first section of barrier film;
   providing a second section of barrier film and positioning said second section adjacent and in face-to-face contact with said first section of barrier film;
   perforating both of said first section and said second section of barrier film along a line that extends through said cutaway area;
   forming an outer seal about the periphery of said first and second sections of barrier film; and
   forming an inner seal extending parallel to said edge and spaced inwardly therefrom and cooperating with a portion of said outer seal to form a product cavity.

* * * * *